United States Patent
Takeda et al.

(10) Patent No.: US 9,785,831 B2
(45) Date of Patent: Oct. 10, 2017

(54) PERSONAL INFORMATION COLLECTION SYSTEM, PERSONAL INFORMATION COLLECTION METHOD AND PROGRAM

(71) Applicants: Daisuke Takeda, Tokyo (JP); Hiroyuki Nakaya, Tokyo (JP)

(72) Inventors: Daisuke Takeda, Tokyo (JP); Hiroyuki Nakaya, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/963,447

(22) Filed: Dec. 9, 2015

(65) Prior Publication Data
US 2016/0171298 A1 Jun. 16, 2016

(30) Foreign Application Priority Data

Dec. 11, 2014 (JP) .................................. 2014-251089
Dec. 4, 2015 (JP) .................................. 2015-237297

(51) Int. Cl.
*G06K 9/00* (2006.01)
*G06K 9/18* (2006.01)
(Continued)

(52) U.S. Cl.
CPC ... *G06K 9/00469* (2013.01); *G06F 17/30253* (2013.01); *G06F 17/30268* (2013.01); *G06F 21/6245* (2013.01); *G06K 9/18* (2013.01)

(58) Field of Classification Search
None
See application file for complete search history.

(56) References Cited

U.S. PATENT DOCUMENTS

| 6,295,387 B1 * | 9/2001 | Burch | G06K 9/033 382/311 |
| 8,938,671 B2 * | 1/2015 | Eisen | G06F 21/6245 715/255 |

(Continued)

FOREIGN PATENT DOCUMENTS

| JP | H04-124785 | 4/1992 |
| JP | 2007-133670 | 5/2007 |

(Continued)

OTHER PUBLICATIONS

Office Action dated Sep. 13, 2016 to Japanese Patent Application No. 2016-162080.

(Continued)

*Primary Examiner* — Bernard Krasnic
(74) *Attorney, Agent, or Firm* — IPUSA, PLLC

(57) ABSTRACT

There is provided a personal information collection system comprising: an image reading unit configured to read an image of a document including personal information; an image dividing unit configured to divide a part of the image of the document corresponding to the personal information into a plurality of divided images; a correspondence management unit configured to manage correspondence relation between the divided images and an original image that is the part of the image of the document before being divided; a data entry unit configured to accept data input based on a visual observation of the divided images; and a connection unit configured to connect the input data based on the correspondence relation.

6 Claims, 16 Drawing Sheets

(51) Int. Cl.
*G06K 9/34* (2006.01)
*G06F 21/62* (2013.01)
*G06F 17/30* (2006.01)

(56) References Cited

U.S. PATENT DOCUMENTS

| | | | |
|---|---|---|---|
| 2003/0144837 A1* | 7/2003 | Basson | G10L 15/32 |
| | | | 704/231 |
| 2005/0036681 A1* | 2/2005 | Lenoir | G06F 17/243 |
| | | | 382/176 |
| 2007/0106902 A1 | 5/2007 | Miyata | |
| 2007/0183000 A1* | 8/2007 | Eisen | H04N 1/00864 |
| | | | 358/452 |
| 2008/0002911 A1* | 1/2008 | Eisen | G06F 21/6245 |
| | | | 382/283 |
| 2012/0082382 A1* | 4/2012 | Baltsan | G06F 17/243 |
| | | | 382/182 |
| 2012/0284096 A1* | 11/2012 | Gomes | G06Q 50/06 |
| | | | 705/14.14 |

FOREIGN PATENT DOCUMENTS

| | | |
|---|---|---|
| JP | 2008-234500 | 10/2008 |
| JP | 2013-258566 | 12/2013 |
| JP | 2014-067209 | 4/2014 |
| JP | 2014067209 A * | 4/2014 |
| JP | 2014-098979 | 5/2014 |

OTHER PUBLICATIONS

Office Action dated Sep. 13, 2016 to Japanese Patent Application No. 2016-162081.

* cited by examiner

FIG.8

| Branch Code | Account Number | Customer Name | Address | ... | Collection Id |
|---|---|---|---|---|---|
| 356 | 1053453 | Taro | Tokyo... | ... | 16783477 |
| 356 | 1287476 | Jiro | Kanagawa... | ... | 16783478 |
| 356 | 2199076 | Yoshio | Tokyo... | ... | 16783479 |
| 356 | 1087443 | Goro | Kanagawa... | ... | 16783480 |
| 356 | 1298110 | Saburo | Saitama... | ... | 16783481 |
| ... | ... | ... | ... | ... | ... |

| IMAGE | ENTRY | OCR | CORRECTION CONFIRMATION |
|---|---|---|---|
| 1123 | 1123 | | CHECK ☐ |
| 9087 | 9089 | 9087 | CHECK ☐ |
| 2257 | 2257 | 2258 | CHECK ☐ |
| 7890 | 7890 | 7990 | CHECK ☐ |
| 8876 | 88764 | 8876 | CHECK ☐ |

FIG.16

| Branch Code | Account Number | Customer Name | Address | ... | My-Number Item |
|---|---|---|---|---|---|
| 356 | 1053453 | Taro | Tokyo... | ... | xxxx xxxx xxxx xxxx |
| 356 | 1287476 | Jiro | Kanagawa... | ... | xxxx xxxx xxxx xxxx |
| 356 | 2199076 | Yoshio | Tokyo... | ... | xxxx xxxx xxxx xxxx |
| 356 | 1087443 | Goro | Kanagawa... | ... | xxxx xxxx xxxx xxxx |
| 356 | 1298110 | Saburo | Saitama... | ... | xxxx xxxx xxxx xxxx |
| ... | ... | ... | ... | ... | ... |

PERSONAL INFORMATION COLLECTION SYSTEM, PERSONAL INFORMATION COLLECTION METHOD AND PROGRAM

BACKGROUND OF THE INVENTION

1. Field of the Invention

The present disclosure relates to personal information collection systems, personal information collection methods and programs.

2. Description of the Related Art

In operations for collecting personal information, it is required to highly ensure information security. In particular, in a case where an operation for widely collecting personal information is outsourced, various parties are involved in the operation. In such case, rules based on human decisions are not sufficient for ensuring security of the personal information.

Recently, in Japan, since Social Security and Tax Number System (so called "my-number system") has been established, operations are expected, in which "my-number" items that are personal information items are widely collected. Hence, a solution for ensuring the security of the personal information items calls for urgent attention. Additionally, the "my-number system" is a social infrastructure for identifying respective personal information items kept in a plurality of organizations, where identification numbers are allocated to respective citizens so as to improve administrative efficiency, enhance public convenience, and realize a fairer and more just society.

Meanwhile, in Patent Document 1, a technology for achieving certain protection and simple management of classified information by storing information items in a discrete storage area in accordance with a user's instruction through a user interface is disclosed, where scanned documents of image data and electronic documents are divided into secure documents and non-secure documents.

However, the aforementioned method for dividing the electronic documents into the secure documents and non-secure documents cannot apply to an operation specialized in handling the personal information items such as "my-number". It is still difficult to ensure the security of the personal information items.

RELATED ART DOCUMENT

Patent Document

[Patent Document 1]: Japanese Unexamined Patent Application Publication No. 2007-133670

SUMMARY OF THE INVENTION

An object of disclosure of the present technology is to ensure the information security in an operation for collecting personal information items.

The following configuration is adopted to achieve the aforementioned object.

In one aspect of the embodiment, there is provided a personal information collection system comprising: an image reading unit configured to read an image of a document including personal information; an image dividing unit configured to divide a part of the image of the document corresponding to the personal information into a plurality of divided images; a correspondence management unit configured to manage correspondence relation between the divided images and an original image that is the part of the image of the document before being divided; a data entry unit configured to accept data input based on a visual observation of the divided images; and a connection unit configured to connect the input data based on the correspondence relation.

Other objects, features and advantages of the present invention will become more apparent from the following detailed description when read in conjunction with the accompanying drawings.

BRIEF DESCRIPTION OF THE DRAWINGS

FIG. 3 is a block diagram for illustrating an example hardware configuration of a terminal apparatus, and the like.

FIG. 8 is a diagram for illustrating an example dispatch request data in which the collection IDs are added.

FIG. 16 is a diagram for illustrating an example delivery data.

DETAILED DESCRIPTION OF THE PREFERRED EMBODIMENTS

In the following, embodiments will be described with reference to accompanying drawings. Additionally, although embodiments, in which a collection of "my-number" items is performed, are described, personal information items other than "my-number" items may be collected. Additionally, a my-number item is a personal information item used in Japanese Social Security and Tax Number System by which an individual person is identified, for example.

<Configuration>

Figure 1:
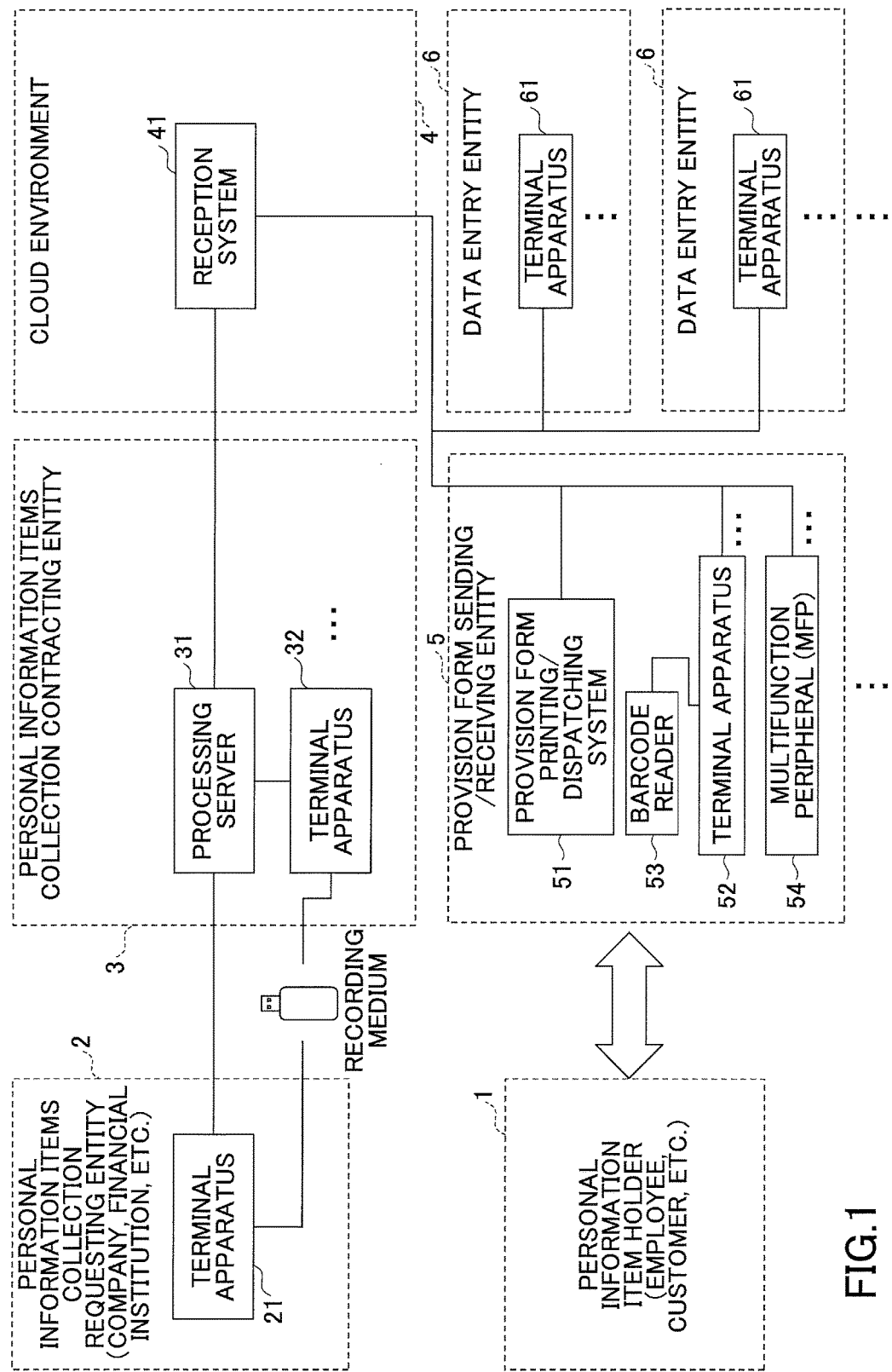
FIG. 1 is a diagram for illustrating an example configuration of a system of the present embodiment.

FIG. 1 is a diagram for illustrating an example configuration of a system of the present embodiment. In FIG. 1, a personal information item holder 1 is an employee or a customer to whom a my-number item has been allocated, where the my-number item is to be collected. A personal information items collection requesting entity 2 (herein after referred to as collection requesting entity 2) is an organization that needs to collect the my-number items, such as a company, and a financial institution. The company, the financial institution, etc., are required to obtain approvals from the employee, the customer, etc., in order to collect their "my-number" items so as to perform administrative tasks regarding tax payment, etc., of the employee, the customer, etc.

A personal information items collection contracting entity 3 (hereinafter referred to as collection contracting entity 3) is a business operator who contracts to collect the my-number items in response to a request from the collection requesting entity 2. A cloud environment 4 is an environment for providing resources of computer hardware and software in a network. A provision form sending/receiving entity 5 (hereinafter sending/receiving entity 5) is a business operator who sends a my-number item provision form to the personal information item holder 1 and receives a reply thereof based on a contract with the collection contracting entity 3. A data entry entity 6 is a business operator who performs a data entry operation based on a contract with the sending/receiving entity 5.

A terminal apparatus 21 is provided under management of the collection requesting entity 2, where dispatch request data including address, name, etc., of the personal information item holder 1 whose my-number item needs to be managed by the collection requesting entity 2 is output from the terminal apparatus 21. Here, "under management" means that the apparatus, the terminal, etc., are authorized to perform desired information processing regardless of the location or proprietary of the apparatus, the terminal, etc.

A processing server 31 and a terminal apparatus 32 are provided under management of the collection contracting entity 3. The processing server 31 acquires the dispatch request data from the terminal apparatus 21 of the collection requesting entity 2 online, or acquires the dispatch request data through a recording medium such as a flash memory and the terminal apparatus 32, thereby transmitting the acquired dispatch request data to the cloud environment 4.

A reception system 41 that performs primary processes in a my-number items collection operation is provided in the cloud environment 4. The reception system 41 is configured by one or more information processing apparatuses such as servers, and a system configuration of the reception system 41 including a number of the information processing apparatus used in the reception system 41 can be flexibly changed in accordance with volume of business.

A provision form printing/dispatching system 51, a terminal apparatus 52 and a multifunction peripheral 54 are provided under management of the sending/receiving entity 5. For example, the provision form printing/dispatching system 51 is configured by an information processing apparatus including a computer operated by a system administrator and a printing apparatus which can perform printing operation on an exclusive paper or a special material including an envelope and a seal different from a plain paper. The provision form printing/dispatching system 51 acquires the dispatch request datum, to which a collection ID for management is given, from the reception system 41, thereby printing respective documents (my-number item provision form, etc.) which are to be dispatched to the personal information item holder 1 based on the dispatch request datum. The terminal apparatus 52 read a barcode (one dimensional code) printed on a reply envelope of my-number item provision form that is sent from the personal information item holder 1 by using a barcode reader 53, thereby performing a reception registration, and the like. A barcode is printed on the envelope since the barcode readers 53 are more widely spread in comparison to two dimensional code readers. However, the two dimensional code may be used instead of the barcode. The terminal apparatus 52 is also used for examination after reception, and the like. The multifunction peripheral 54 reads an image of the my-number item provision form, and reads a two dimensional code printed on the my-number item provision form, and the like.

One or more terminal apparatuses 61 are provided under management of the data entry entity 6. The terminal apparatus 61 is used for entry of data based on visual observation of a divided part of the image of the my-number item provision form, where the divided part includes an image of the handwritten my-number item.

Figure 2:
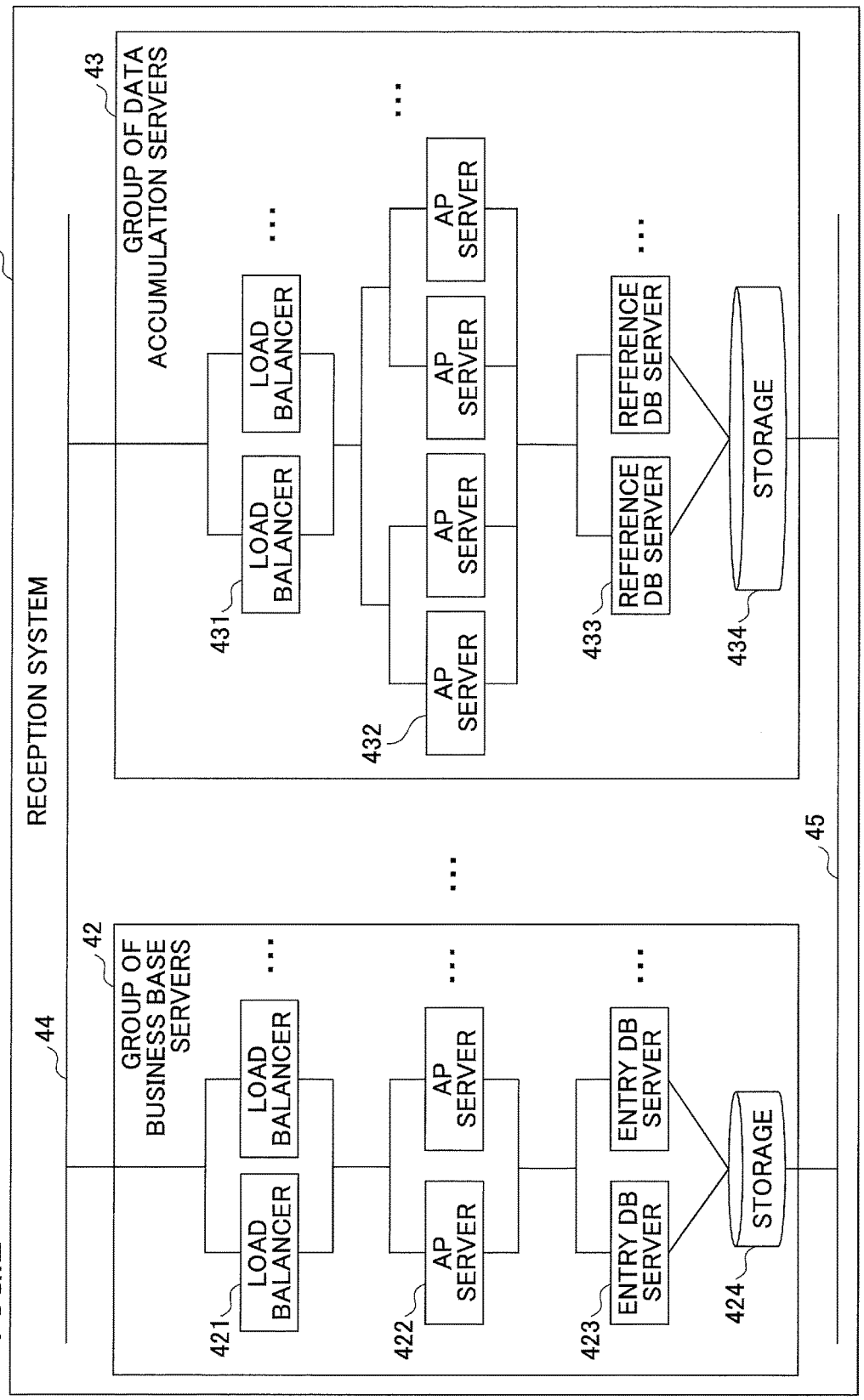
FIG. 2 is a diagram for illustrating a configuration of the reception system.

FIG. 2 is a diagram for illustrating a configuration of the reception system 41 achieved in the cloud environment 4. In FIG. 2, the reception system 41 includes a plurality of groups of business base servers 42 and a group of data accumulation servers 43, where the group of business base servers 42 are provided at respective business bases of the sending/receiving entity 5 and data entry entity 6, and the group of data accumulation servers 43 collectively manages the data. Only accesses from corresponding business base to the group of business base servers 42 are allowed.

The group of business base servers 42 includes a plurality of load balancers 421, a plurality of AP servers (application servers) 422, a plurality of entry DB servers (entry database server) 423 and a virtual storage 424. The load balancer 421 distributes data or process request, which is transmitted from an external apparatus through a network (network 44), to a plurality of the apparatuses (AP servers 422) so as to reduce a workload with respect to each apparatus, where the respective apparatuses have similar functions and capacity. The AP servers 422 execute application programs for performing operations of the respective business bases. The entry DB server 423 provides a DB processing function to the storage 424. The data distributed to the AP servers 422 are gathered and stored in the storage 424 through the entry DB server 423; where a cluster configuration (a plurality of computers are connected so as to serve as one computer) is adopted to achieve a virtual storage of the storage 424.

The group of data accumulation servers 43 includes a plurality of load balancers 431, a plurality of AP servers 432, a plurality of reference DB servers 433, and a virtual storage 434. The load balancer 431 distributes data or process request, which is transmitted from an external apparatus through a network (network 44), to a plurality of the apparatuses (AP servers 432) so as to reduce a workload with respect to each apparatus and to improve system response, where the respective apparatuses have similar functions and capacity. The AP servers 432 execute application programs for data inquiry, and the like. The reference DB server 433 provides a DB processing function to the storage 434. The data distributed to the AP servers 432 are gathered and stored in the clustered virtual storage of the storage 434 through the reference DB server 433.

Also, the data accumulated in the storage 424 of the group of business base servers 42 are gathered and stored in the storage 434 of the group of data accumulation servers 43 via network 45 through night batch processing, and the like.

Figure 3:
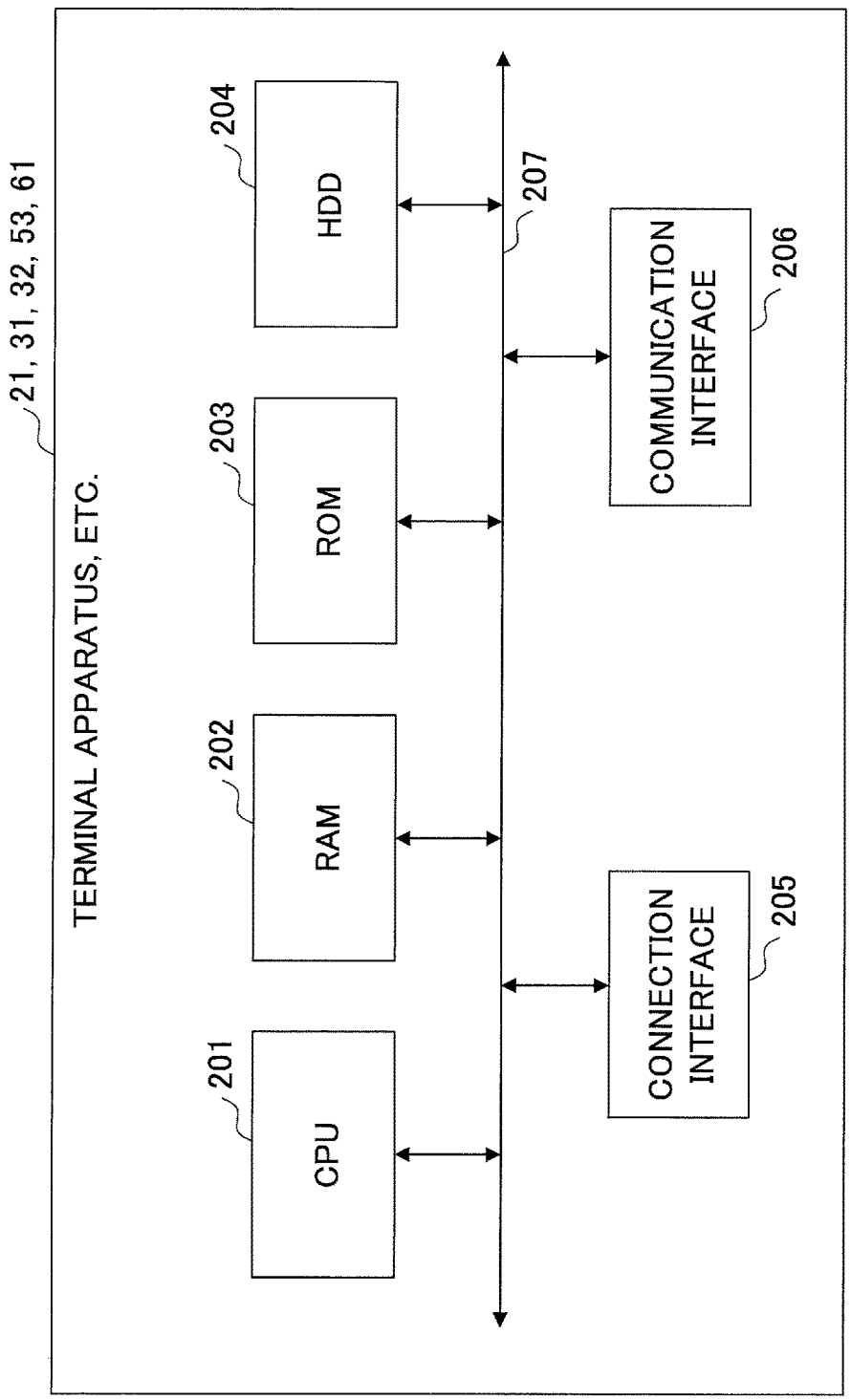

FIG. 3 is a block diagram for illustrating an example hardware configuration of terminal apparatus 21, etc. (the terminal apparatus 21, the processing server 31, the terminal apparatus 32, the terminal apparatus 52, and the terminal apparatus 61). In FIG. 3, the terminal apparatus 21, etc., includes a CPU (Central Processing Unit) 201, a RAM (Random Access Memory) 202, a ROM (Read Only Memory) 203, a HDD (Hard Disk Drive) 204, a connection interface 205 and a communication interface 206, where the aforementioned elements are connected to each other through a bus 207. The CPU 201 totally controls operations of the terminal apparatus 21, etc., by executing programs stored in ROM 203, HDD 204, etc., using the RAM 202 as a work area. The connection interface 205 is provided for connecting other device to the terminal apparatus 21, etc. The communication interface 206 is provided for communicating with another information processing apparatus through the network.

Figure 4:
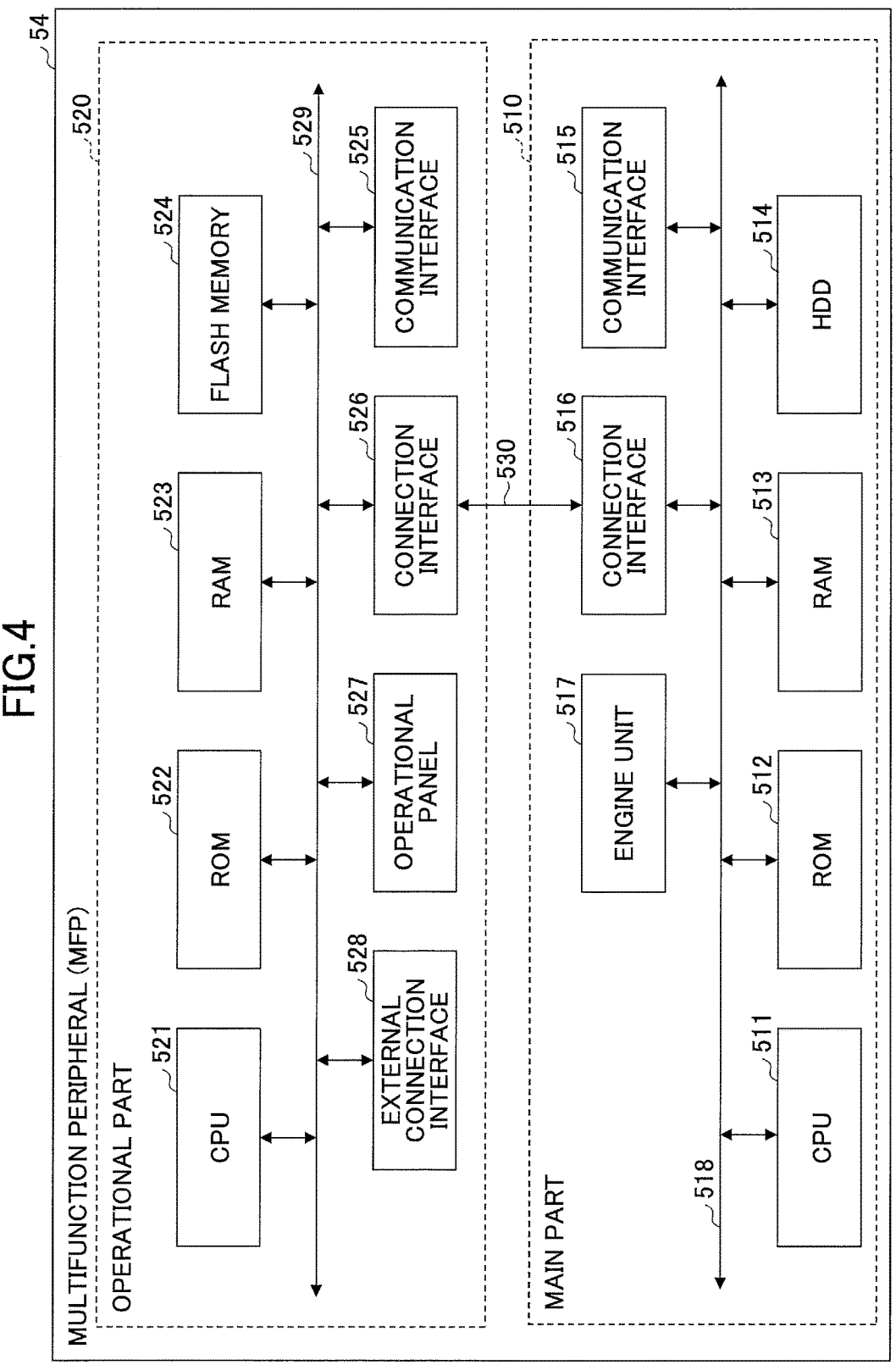
FIG. 4 is a diagram for illustrating an example hardware configuration of the multifunction peripheral.

FIG. 4 is a diagram for illustrating an example hardware configuration of the multifunction peripheral 54. In FIG. 4, the multifunction peripheral 54 includes a main part 510 for achieving functions of a copier, a scanner, a fax, a printer, etc., and an operational part 520 for accepting user's operations. The main part 510 and the operational part 520 are connected through a dedicated communication path 530 so as to be capable of communicating with each other. For example, the communication path 530 is configured to be in compliance with a USB (Universal Serial Bus) standard. However, the communication path 530 may be in compliance with an arbitrary standard (regardless wired or wireless). Additionally, the main part 510 can be operated in accordance with an instruction based on the operation accepted by the operational part 520. Also, the main part 510 can communicate with an external apparatus such as a client PC (personal computer), and can be operated in accordance with an instruction received from the external apparatus.

The main part 510 includes a CPU 511, a ROM 512, a RAM 513, a HDD 514, a communication interface 515, a connection interface 516 and an engine unit 517, where the aforementioned elements are connected to each other through a bus 518.

The CPU 511 totally controls operations of the main part 510. The CPU 511 controls entire operations of the main part 510 to achieve the functions of a copier, a scanner, a fax, a printer, etc., by executing programs stored in ROM 512, HDD 514, etc., using the RAM 513 as a work area. The communication interface 515 is provided for connecting to the network. The connection interface 516 is provided for connecting to the operational part 520 through the communication path 530. The engine unit 517 is a hardware unit for performing processes for achieving the functions of a copier, a scanner, a fax, and a printer, other than processes of general information processing and communication. For example, the engine unit 517 includes a scanner for scanning an image of a document, a plotter (image forming unit) for performing print on a sheet medium, etc., a fax unit for performing fax communications. Further, a finisher for storing the printed sheet media, an ADF (Auto Document Feeder) for automatically feeding the document, etc., may be included as specific optional units.

The operational part 520 includes a CPU 521, a ROM 522, a RAM 523, a flash memory 524, a communication interface 525, a connection interface 526, operational panel 527 and an external connection interface 528, where the aforementioned elements are connected to each other through a bus 529. The CPU 521 totally controls operations of the operational part 520. The CPU 521 controls entire operations of the operational part 520 to achieve respective functions for displaying an image of information in accordance with accepted user's input, by executing programs stored in the ROM 522, the flash memory 524, etc., using the RAM 523 as a work area. The communication interface 525 is provided for connecting to the network. The connection interface 526 is provided for connecting to the main part 510 through the communication path 530. The operational panel 527 accepts respective inputs in accordance with the user's operations and displays respective information (e.g., information in accordance with the accepted operation, information indicating an operational state of the multifunction peripheral 54, information indicating a setting state, etc.). Further, an operational unit including hardware keys or display unit including lamps may be provided in addition to or instead of the operational panel 527. The external connection interface 528 is provided for connecting to an external device such as an IC card reader.

<Operation>

Figure 5:
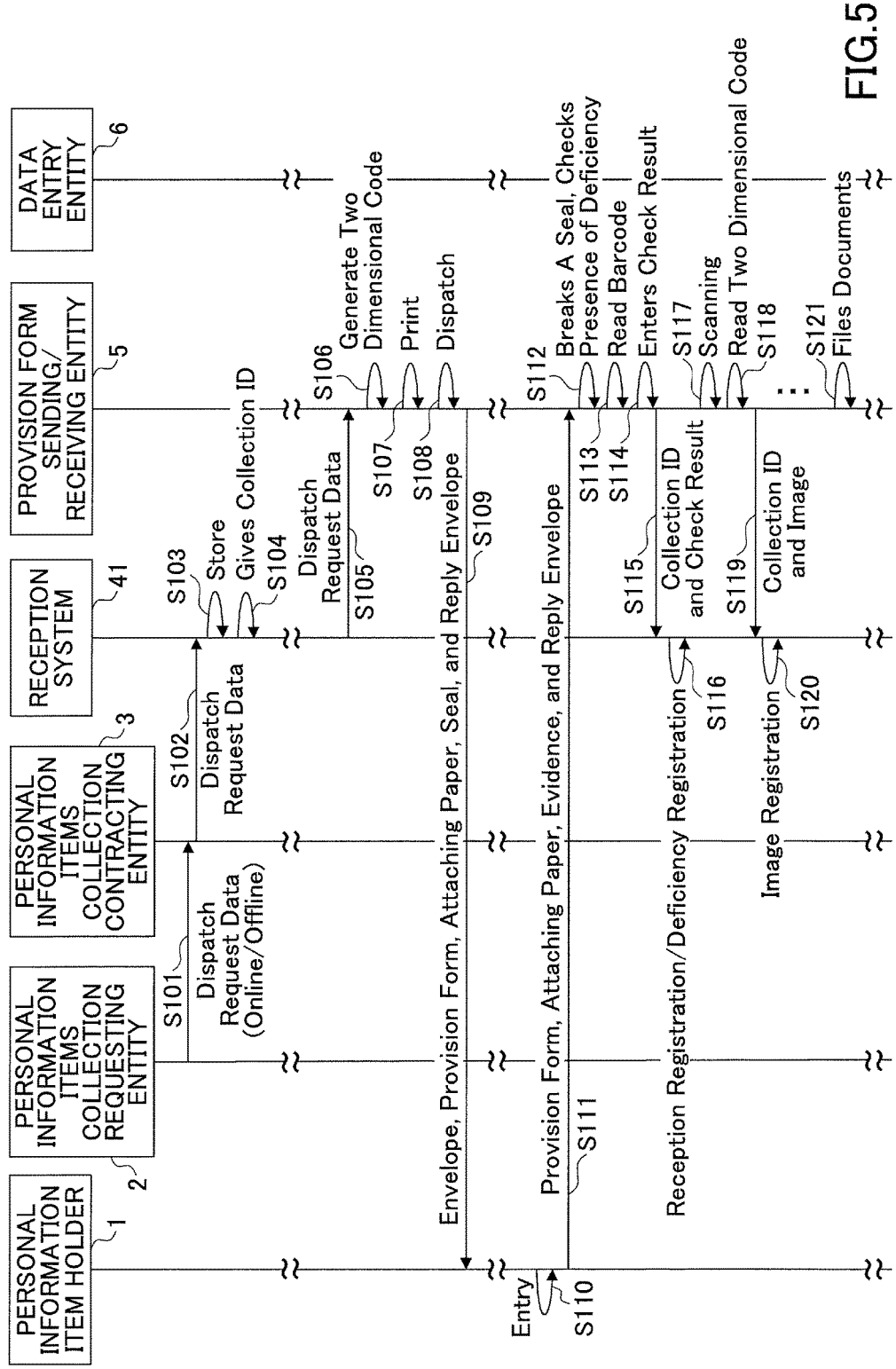
FIG. 5 is a sequence diagram for illustrating an example process of the present embodiment.
Figure 6:
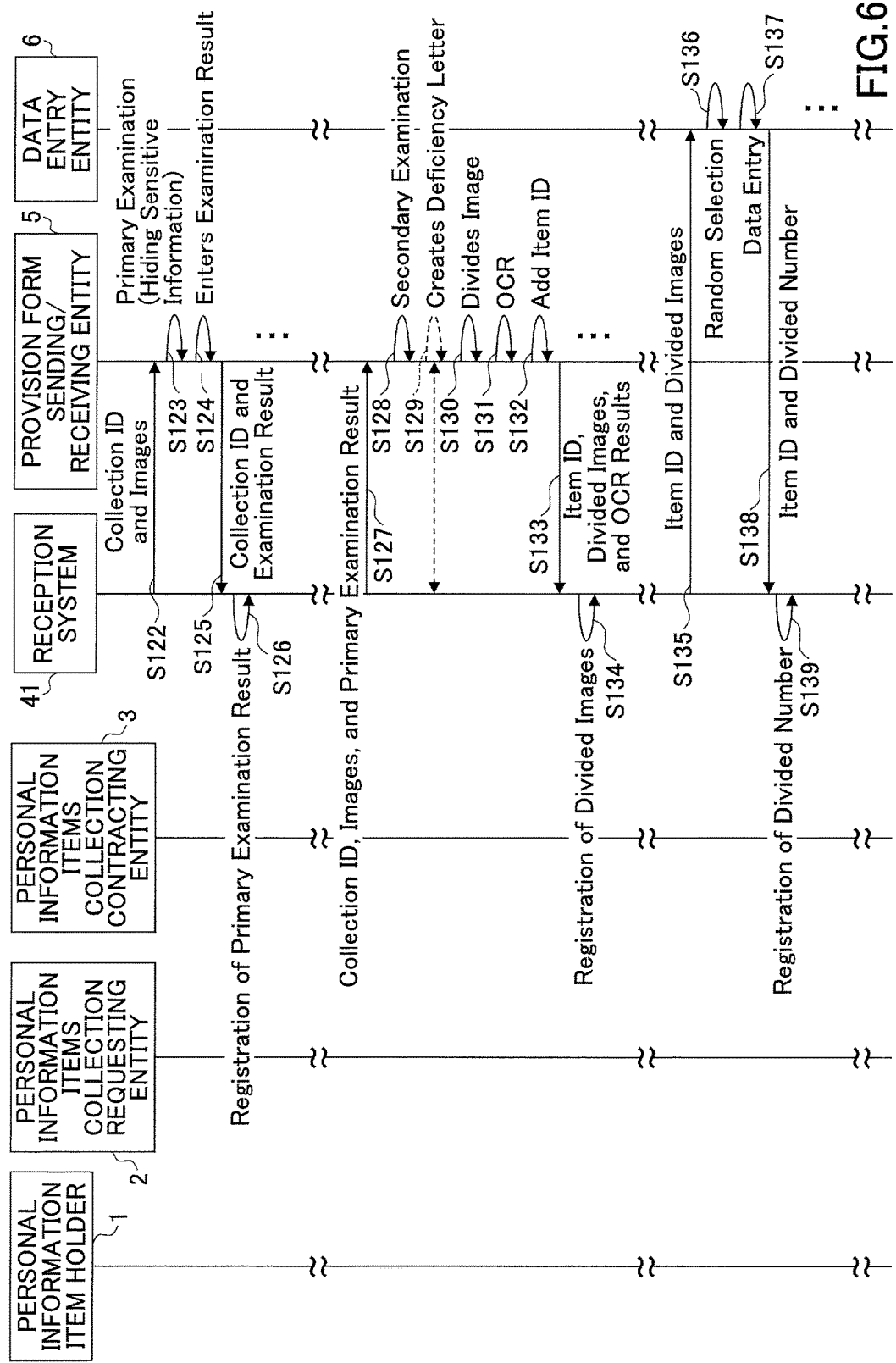
FIG. 6 is another sequence diagram for illustrating an example process of the present embodiment.
Figure 7:
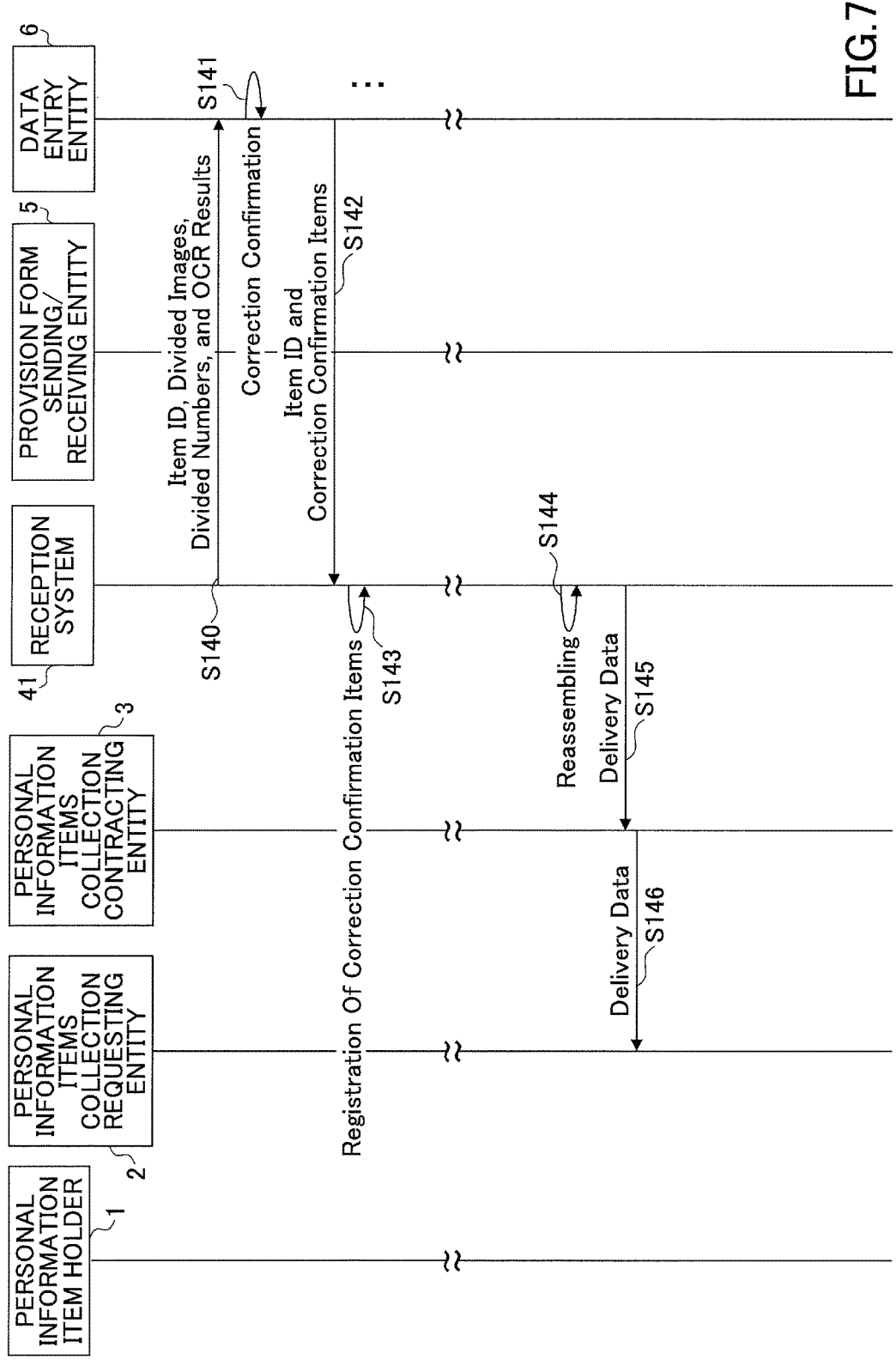
FIG. 7 is another sequence diagram for illustrating an example process of the present embodiment.

FIG. 5-FIG. 7 are sequence diagrams for illustrating example processes of the present embodiment.

<Dispatch Request>

In FIG. 5, the terminal apparatus 21 of the collection requesting entity 2 provides the processing server 31 of the collection contracting entity 3 with the dispatch request data directly (online) through the network (step S101). Or, the dispatch request data is provided from the terminal apparatus 32 of the collection contracting entity 3 to the processing server 31 through the recording medium (offline) (step S101). One or more personal information items of the personal information item holder 1 whose my-number item needs to be collected and managed by a company or a financial institution that serves as the collection requesting entity 2 is included in the dispatch request data. Also, at least a name and an address of the personal information item holder 1 are included in the personal information. The processing server 31 of the collection contracting entity 3 transmits the provided dispatch request data to the reception system 41 of the cloud environment 4 (step S102).

The reception system 41 stores the received dispatch request data in the storage 434 (step S103), and gives unique collection IDs to respective records of the dispatch request data at a certain timing (step S104). The collection IDs may be sequential numbers or random numbers avoiding duplications. That is, as described below, one my-number item that is to be collected is managed in the reception system 41 by using one collection ID. The collection ID is an information item different from the my-number item. Also, preferably, numbers or signs with which the my-number is unlikely to be conceived are preferably used in the collection ID. FIG. 8 is a diagram for illustrating an example dispatch request data in which the collection IDs are added. In the example, respective items of "branch code", "account number", "customer name", "address", "collection ID", etc., are included. Information for identifying a branch of the financial institution is input in the "branch code", an account number of a customer serving as the personal information item holder 1 whose personal information needs to be managed by the financial institution is input in the "account number", the name of the customer is input in the "customer name", the address of the customer is input in the "address", and the collection ID allocated to the record is input in the "collection ID". Also, as described below, the my-number item is managed upon the my-number item being obtained from the customer (user). However, the my-number item has not been registered when performing a process of step S104. Additionally, an item "my-number" may be provided at this stage.

<Dispatch>

In FIG. 5, the provision form printing/dispatching system 51 of the sending/receiving entity 5 acquires the dispatch request data in which the collection IDs are added from the reception system 41 (step S105), and generates the barcodes (one dimensional code) and the two dimensional codes in which the collection IDs are embedded on a record-by-record basis (step S106). The barcodes are used for reply envelopes. The two dimensional codes are used for the my-number item provision form.

The provision form printing/dispatching system 51 prints respective documents to be dispatched to the customer based on a certain template and the dispatch request data. Specifically, the provision form printing/dispatching system 51 prints envelopes (for dispatch) on which the name and the address of the customer is printed, the my-number item provision forms including the two dimensional code in which the customer enters the own my-number item, notification card attaching papers including the two dimensional code for acquiring a copy of a notification card held by the customer, seals of destination for reply envelope including the barcode, and the reply envelopes based on printing data thereof (step S107). Additionally, among the aforementioned documents, documents that can be prepared without the dispatch request data may not be printed in step S107 and may be printed in advance. For example, the reply envelopes may be printed in advance in the present embodiment. The envelopes (for dispatch) printed by the provision form printing/dispatching system 51, in which the my-number item provision forms, notification card attaching papers, seals of destination for reply envelope and the reply envelopes are enclosed, are dispatched to the personal information item holders 1 by a staff member in charge of operating the provision form printing/dispatching system 51 (steps S108 and S109).

Figure 9:
FIG. 9 is a diagram for illustrating an example my-number item provision form.

FIG. 9 is a diagram for illustrating an example my-number item provision form, where the two dimensional code in which the collection ID is embedded is printed at an upper right corner portion of the my-number item provision form. Also, in other three corner portions of the my-number item provision form, marks are printed for easy recognition of upper and lower sides and front and back surfaces of the my-number item provision form. In the my-number item provision form, my-number item entry frames (12 digits of the my-number item is divided into three 4 digits numbers and entered in respective three my-number item entry frames) for entering the my-number item of the personal information item holder 1, and my-number item entry frames for entering my-number item of a dependent family member of the personal information item holder 1 are provided. Additionally, the number of the entry frames may not be three. For example, one entry frame divided with dotted lines so that the user can recognize respective frames for 12 digits may be used. Also, the number of the digits entered in the respective entry frames is not necessary to be the same, and digits other than four digits may be entered in the respective entry frames.

Figure 10:
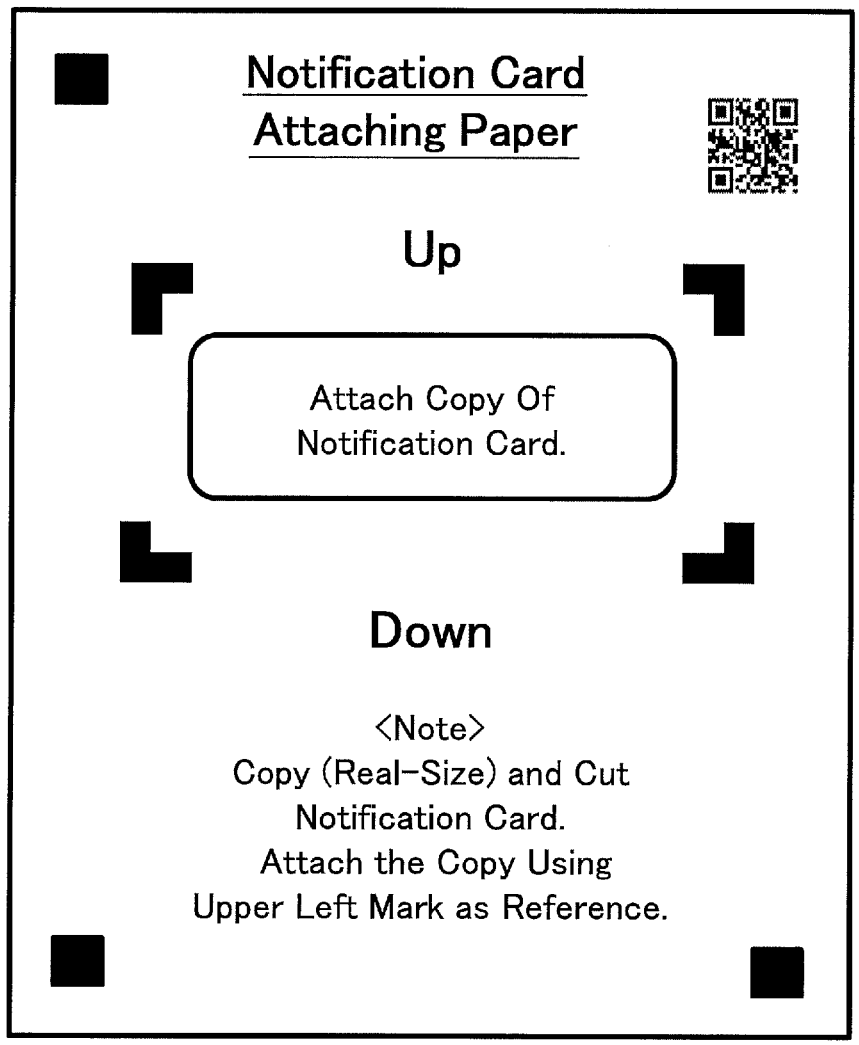
FIG. 10 is a diagram for illustrating an example notification card attaching paper.

FIG. 10 is a diagram for illustrating an example notification card attaching paper, where the two dimensional code and marks are similarly printed to the my-number item provision form shown in FIG. 9, and a space for attaching the notification card of the my-number item (issued by a municipality) is provided.

Figure 11B:
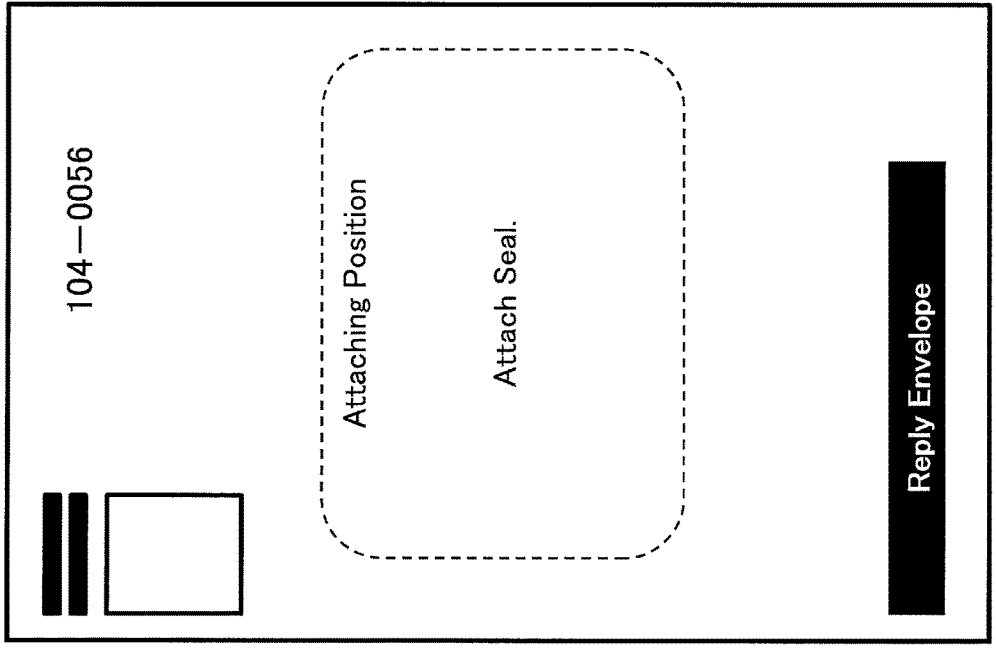
FIG. 11B is a diagram for illustrating an example reply envelope.
Figure 11A:
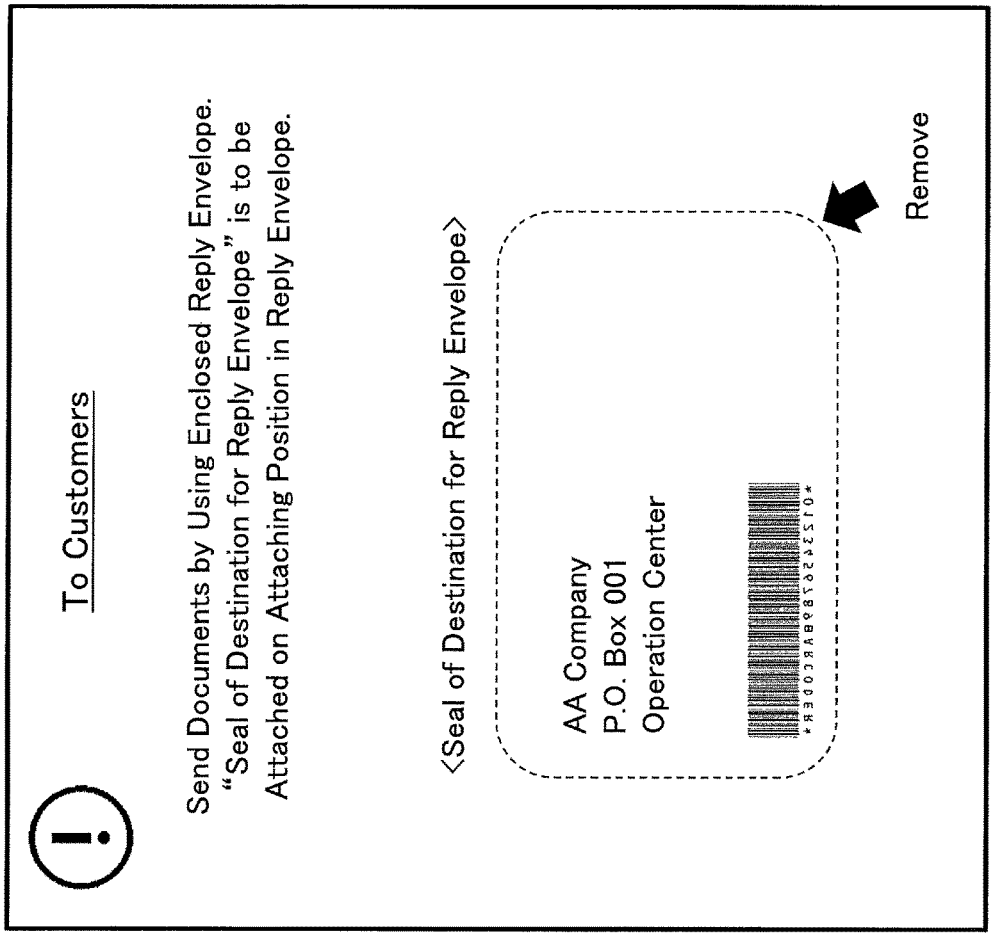
FIG. 11A is a diagram for illustrating an example seal of destination for reply envelope.

FIG. 11A is a diagram for illustrating an example seal of destination for reply envelope. FIG. 11B is a diagram for illustrating an example reply envelope. As shown in FIG. 11A, the seal of destination including the barcode is printed on a seal mount, and as shown in FIG. 11B, a space for attaching the seal of destination is provided in the reply envelope.

<Receipt>

In FIG. 5, the personal information item holder 1, who has received the envelope in which the respective documents are enclosed, enters the my-number item in the my-number item provision form, attaches a copy of the notification card to the notification card attaching paper, attaches the seal of destination for reply envelope to the reply envelope, and encloses an evidence such as a residence certificate with the my-number item provision form and the notification card attaching paper in the reply envelope (step S110), thereby sending back the reply envelope to the sending/receiving entity 5 (step S111).

A staff member of the sending/receiving entity 5 breaks a seal of the received reply envelope to check whether respective documents are included and information is entered therein (checks a presence of obvious deficiency) (step S112). Upon the staff of the sending/receiving entity 5 having the barcode reader 53 read the barcode of the received reply envelope (step S113) and entering check result of the obvious deficiency (step S114), the terminal apparatus 52 transmits the collection ID embedded in the barcode and the check result to the reception system 41 (step S115). In response to receiving the aforementioned information from the terminal apparatus 52, the reception system 41 performs a reception registration or deficiency registration (step S116).

The staff of the sending/receiving entity 5 operates the multifunction peripheral 54 to scan all of the documents having been enclosed in the reply envelope (step S117). The multifunction peripheral 54 reads the two dimensional code, which is printed at a predetermined position in the document (step S118), and images of the scanned documents associated with the collection ID embedded in the two dimensional code are transmitted to the reception system 41 (step S119). In response to receiving the aforementioned information from the multifunction peripheral 54, the reception system 41 performs image registration (step S120). The respective images to which a management numbers are given are registered, where the management numbers are generated by adding sub-numbers to the collection ID. For example, in a case where the read collection ID is "1" and three documents are read, management numbers of "1-1", "1-2", and "1-3" are given to the respective documents so as to recognize the respective documents associated with the collection ID. Additionally, characters other than the number may be used as long as a plurality of types of the documents enclosed in the same envelope can be recognized. Also, in a case where the staff operates the multifunction peripheral 54 to scan the documents related to one personal information item holder 1 at a time, the multifunction peripheral 54 can manage the documents (accompanying documents such as a copy of the residence certificate) to which the two dimensional codes are not added by using the collection ID of the two dimensional code as long as the multifunction peripheral 54 can read at least one two dimensional code from the scanned documents. In a case where the staff operates the multifunction peripheral 54 to scan the documents related to a plurality of personal information item holders 1 at a time, for example, the multifunction peripheral 54 can obtain the collection ID corresponding to one personal information item holder 1 from the document scanned first by scanning the documents in order of the my-number item provision form, the notification card attaching paper, the copy of the residence certificate, and the like, wherein the document including the two dimensional code is scanned first according to the aforementioned order. In this case, the obtained collection ID is kept until another collection ID is obtained, and the obtained collection ID is updated when the other collection ID is obtained. The sub-numbers are sequentially added to the scanned documents until the collection ID is updated, where the sub-number is incremented at each document scanning. Thus, the same collection ID is given to the documents related to the one personal information item holder 1, whereas the discrete sub-numbers are added to the respective documents.

The staff of the sending/receiving entity 5 repeatedly performs the aforementioned processes with respect to the reply envelope received from the personal information item holder 1, and files the processed reply envelope and the documents thereof as an exemplar (step S121).

<Primary Examination>

In FIG. 6, the terminal apparatus 52 of the sending/receiving entity 5 acquires document images packed on a project-by-project basis from the reception system 41, where the project is identified by the collection ID (step S122). (Provided however, another terminal apparatus 52 without including the barcode reader 53 is provided in a case where the primary examination is conducted in a department different from the department whose staff is in charge of the receipt of the reply envelope.)

A staff member conducts the primary examination by matching content of the my-number item provision form and the accompanying documents based on the document image displayed on the display of the terminal apparatus 52 (step S123). At this time, mask setting operation for blacking out the sensitive information in the displayed image is also performed. Upon the staff inputting the primary examination result (including reason of deficiency in a case where the deficiency is found) (step S124), the terminal apparatus 52 transmits the collection ID and the primary examination result to the reception system 41 (step S125), and the reception system 41 performs registration of the primary examination result (step S126). The staff repeatedly performs the aforementioned processes with respect to the project.

<Secondary Examination>

The terminal apparatus 52 of the sending/receiving entity 5 acquires document images packed on a project-by-project basis from the reception system 41 and the primary examination result, where the project is identified by the collection ID (step S127). (Provided however, another terminal apparatus 52 is provided in a case where the secondary examination is conducted in a department different from the department whose staff is in charge of the primary examination.) A staff member conducts the secondary examination by matching content of the my-number item provision form and the accompanying documents based on the document image displayed on the display of the terminal apparatus 52 and the primary examination result (step S128). In a case where a deficiency is found in the secondary examination, a deficiency letter is created based on registered information of the reception system 41 (step S129), and the following processes are not performed with respect to the project. The created deficiency letter includes the document image in which the deficiency is found and the reason of the deficiency, and further includes the name, the address, etc., of the destination.

In a case where the deficiency is not found in the secondary examination, the terminal apparatus 52 divides an image of the my-number item into a plurality of images (step S130) in accordance with the respective entry frames to perform OCR (Optical Character Reader) process on the respective divided images (step S131), where item IDs, which are generated by adding a sub-number for indicating respective sequences of division to the collection ID (or management number), are further added to the respective divided images (step S132). Additionally, the divided images may be obtained after performing the OCR process and the processing result of the OCR process may be divided in accordance with the divided images. Also, the sub-number may not added to the item ID as long as the my-number item can be reassembled by gathering the divided numbers based on the item IDs. The terminal apparatus 52 transmits the divided images and the processing result of the OCR process associated with the item IDs to the reception system 41 (step S133), and the reception system 41 registers the information received from the terminal apparatus 52 as divided images (step S134). Additionally, the processing result of the OCR is used for checking data entry operation as described below. The staff repeatedly performs the aforementioned processes with respect to the project.

Figure 12:
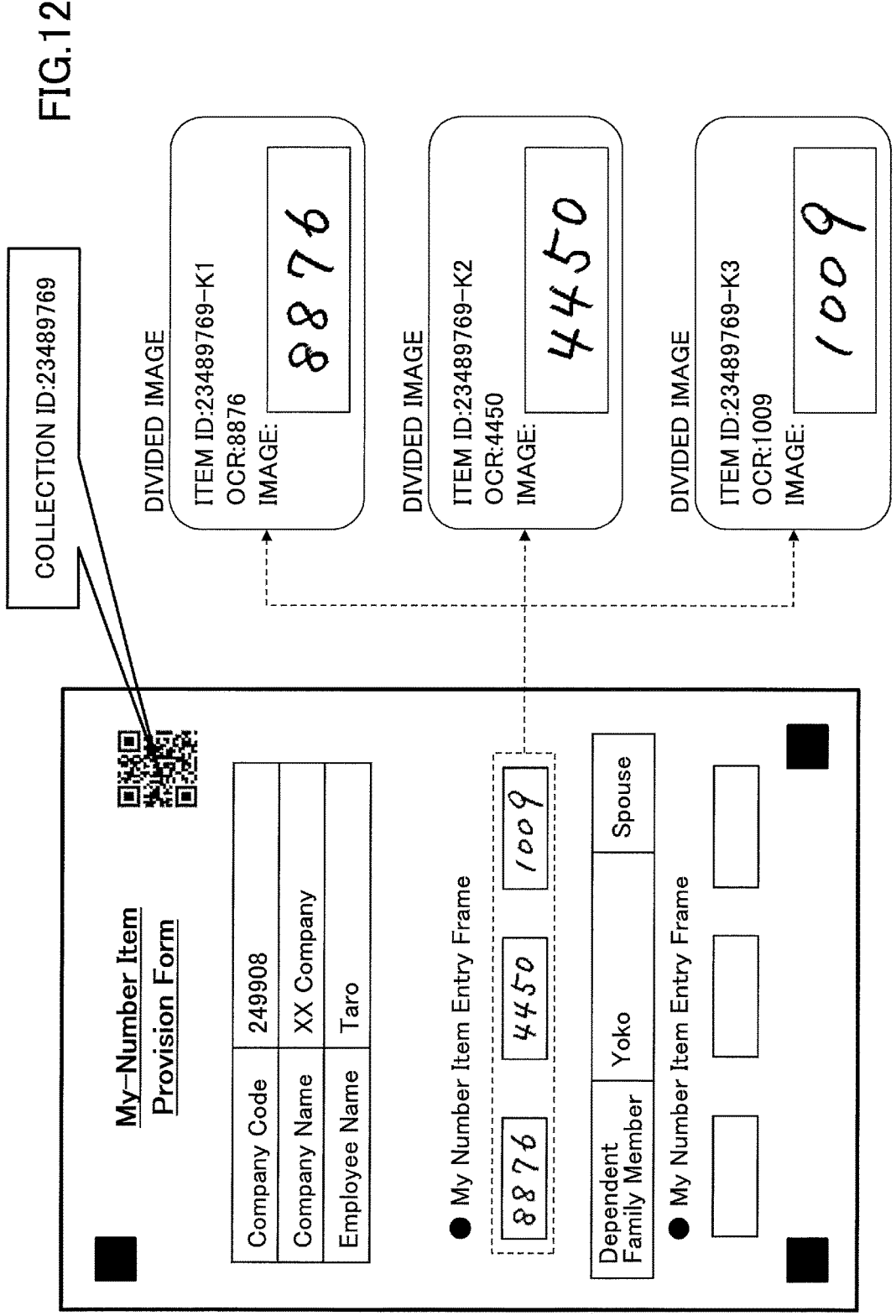
FIG. 12 is a diagram for illustrating an example divided image data.

FIG. 12 is a diagram for illustrating an example divided image data. In FIG. 12, three divided images of 4 digits generated by dividing the image of the my-number item entry frame of the my-number item provision form, the item IDs added to the respective divided images and the processing results of the OCR are shown. In the example, since a plurality of the entry frames are provided in one my-number item provision form, the images of the respective entry frames are obtained. However, in a case where one entry frame is provided in one my-number item provision form, the process can be similarly performed by dividing an image of the one entry frame into image of a plurality of entry frames including a certain number of characters. That is, an information item consisting of a plurality of characters such as the my-number item is divided into plurality of parts. Additionally, sub-numbers used as the management number for recognizing the respective documents and sub-numbers used as the item ID for recognizing the respective divided images are preferably not duplicated within the documents managed by one collection ID. However, for example, if the sub-number starting with "1" is sequentially assigned in respective cases, the duplication of numbers can be avoided by managing the respective divided images by using the item ID in which the sub-number is added to the management number (not to collection ID). In the example shown in FIG. 12, the sub-number for the management number is not added to the collection ID "23489769" of the my-number item provision form, and sub-numbers "K1", "K2", and "K3" are added to the item ID. In this case, when the sub-number is not added to the collection ID of a document, the management number of the document is interpreted to be a character string consisting of the collection ID and a sub-number "0", whereas sub-numbers "1", "2", etc., are added to the collection IDs of other documents so as to create the management numbers. Thus, the respective documents are recognized. Hence, the sub-number "0" may not be added to the collection IDs. Additionally, in the example shown in FIG. 12, although the processing results of the OCR are shown without any problem, a part of numbers or entire numbers may not be recognized depending on a shape of the handwritten numbers. Since the my-number item cannot be found only from one of the divided images, the user cannot identify the my-number item of the personal information item holder 1 by only finding the divided image. Hence, the information security with respect to each one of the divided images may not need to be ensured while the apparatus can identify the my-number item of the personal information item holder 1 based on the item IDs.

<Data Entry>

Figures 13, 14:
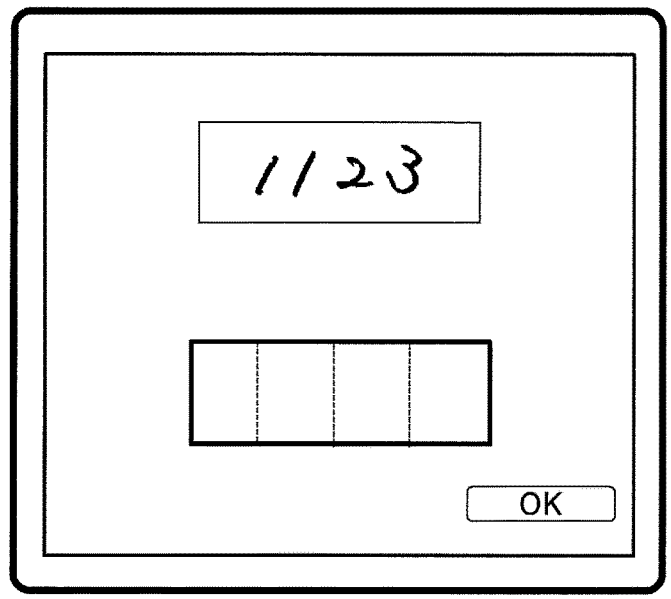
FIG. 13 is a diagram for illustrating an example data entry screen.
FIG. 14 is a diagram for illustrating an example screen of the data correction screen.

In FIG. 6, the terminal apparatus 61 of the data entry entity 6 acquires the divided images (divided image data) identified by the item IDs from the reception system 41 (step S135). The terminal apparatus 61 randomly selects one divided image data to display the one divided image (step S136), and accepts data entry based on a staff member's visual observation (step S137). FIG. 13 is a diagram for illustrating an example data entry screen, where the divided image is shown in upper side, a data entry frame is shown in lower side, and "OK" button is shown in right bottom of the screen. As shown in FIG. 13, the processing result of the OCR is not displayed in the data entry screen. The staff checks the divided image to enter numbers corresponding to the divided image into the data entry frame by using a numeric keypad, etc., and the data entry of one record is completed when the "OK" button is pressed. Additionally, a plurality of the divided images and corresponding data entry frames may be displayed in the data entry screen. However, in this case, the divided images needs to be displayed in the data entry screen in a manner such that the staff (user) cannot identify the my-number item of the personal information item holder 1 by reassembling the respective divided images displayed on the data entry screen. Therefore, preferably, the reception system 41 randomly selects the divided image after preparing the divided images acquired from the my-number item provision forms of a sufficient number of personal information item holders. The sufficient number may be defined by a system operator, and the like. Preferably, the defined number is large.

Referring back to FIG. 6, upon completing the data entry, the terminal apparatus 61 transmits the item ID and a divided number entered with respect to the one divided image through the aforementioned staff's operation to the reception system 41 (step S138), and the reception system 41 registers the divided number associated with the item ID (step S139). The staff repeatedly performs the aforementioned processes with respect to the project.

<Data Correction>

In FIG. 7, the reception system 41 determines whether the processing result of the OCR is coincident with the divided number entered with respect to the one divided image. The reception system 41 reports the divided image to the terminal apparatus 61 of the data entry entity 6 when the processing result of the OCR is not coincident with the divided number entered with respect to the divided image. The terminal apparatus 61 of the data entry entity 6 acquires the item IDs, the divided numbers and processing result of the OCR of the divided image from the reception system 41 in a case where the divided number does not coincide with the processing result of the OCR in the project (step S140).

The terminal apparatus 61 displays data correction screen to accept confirmation (correction confirmation) indicating whether a correction of the data is required from a staff member (step S141). FIG. 14 is a diagram for illustrating an example screen of the data correction screen in which randomly chosen divided images, numbers entered through the staff's operation (divided number), processing results of the OCR and check boxes for correction confirmation are displayed. Additionally, as shown in FIG. 14, the item ID and the collection ID are not displayed in the data correction screen. The staff checks the divided image and the divided number through visual observation, and enters a tick in the check box in a case where the divided number is determined to be correct. The divided number is corrected before entering the tick in the check box in a case where the divided number is determined not to be correct. Additionally, the staff may determine whether the processing result of the OCR is correct. Also, another data entry frame for entering the numbers that are determined to be correct may be provided in the data correction screen.

Figure 15:
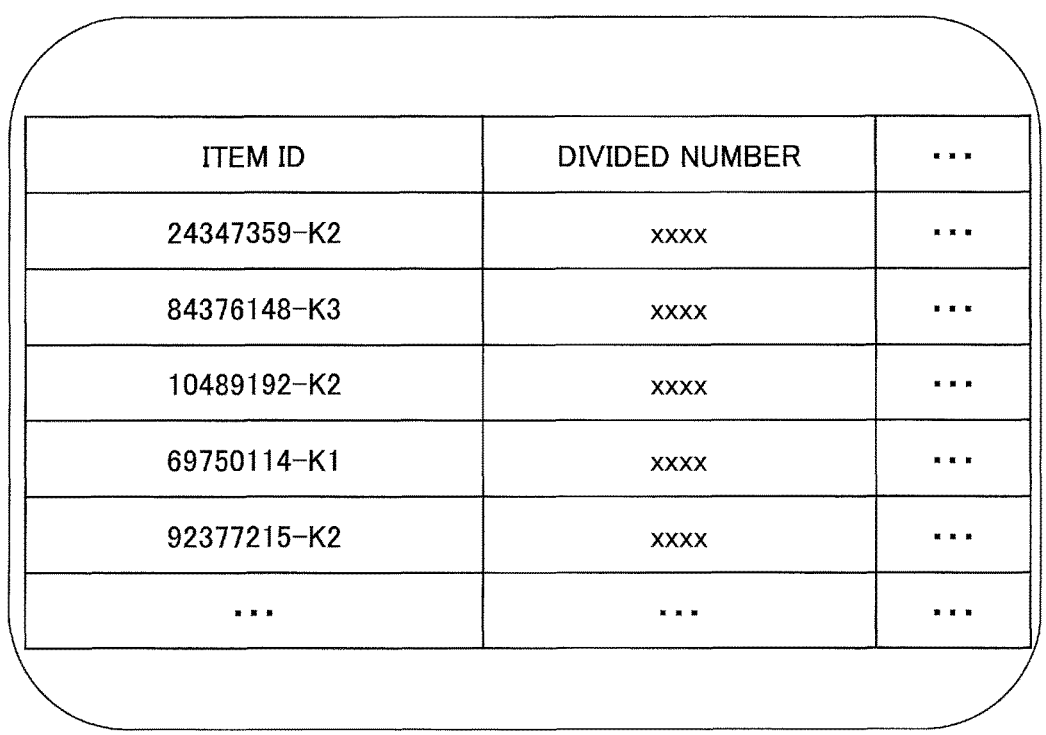
FIG. 15 is a diagram for illustrating an example corrected data.

Referring back to FIG. 7, upon the data correction operation being completed, the terminal apparatus 61 transmits the item IDs and the correction confirmation items to the reception system (step S142), and the reception system 41 registers the correction confirmation items associated with the item IDs (step S143). FIG. 15 is a diagram for illustrating an example corrected data in which the divided numbers that have been confirmed in the correction confirmation are associated with the item IDs. The staff repeatedly performs the aforementioned processes with respect to the project.

Additionally, in the example described above, the precision of the divided number is improved by performing the staff's correction confirmation with respect to a project in a case where the divided number is not coincident with the processing result of the OCR in the project. However, the precise divided number may be determined by choosing the divided number with the highest frequency, where a plurality of the divided numbers are entered by a plurality of staff members with respect to one divided image. In this case, the processing result of the OCR is not required.

<Generation of Delivery Data>

In FIG. 7, the reception system 41 reassembles the data of the my-number item of the personal information item holder 1 based on the entered and corrected data in accordance with the item ID to generate delivery data (step S144). That is, the my-number item is reassembled by gathering the divided numbers based on a main part of the item ID (excluding sub-number from item ID: collection ID), rearranging the divided numbers based on the sequence indicated by the sub-numbers, and the delivery data is generated by connecting the reassembled my-number item with other items. FIG. 16 is a diagram for illustrating an example delivery data in which the item of "my-number item" containing the my-number item generated based on the entered and corrected data is included in addition to the items of "branch code", "account number", "customer name", "address", and the like.

The reception system 41 transmits the delivery data to the collection contracting entity 3 (step S145), and the collection contracting entity 3 provides the collection requesting entity 2 with the delivery data online or offline (step S146).

<Configuration Variation of Reception System>

As described above, the configuration of the reception system 41 may be flexibly changed in accordance with the business volume. It is expected that a business volume of my-number items collection operation will be greatest at an early stage and will be decreased little by little at following stages to become a constant volume since the my-number item starts to be used nationwide from a certain date. If a system capacity is not sufficient for the business volume, a response of the system will be deteriorated, which deteriorates business efficiency. Hence, to ensure an appropriate system capacity in accordance with the business volume is important.

Figure 17A:
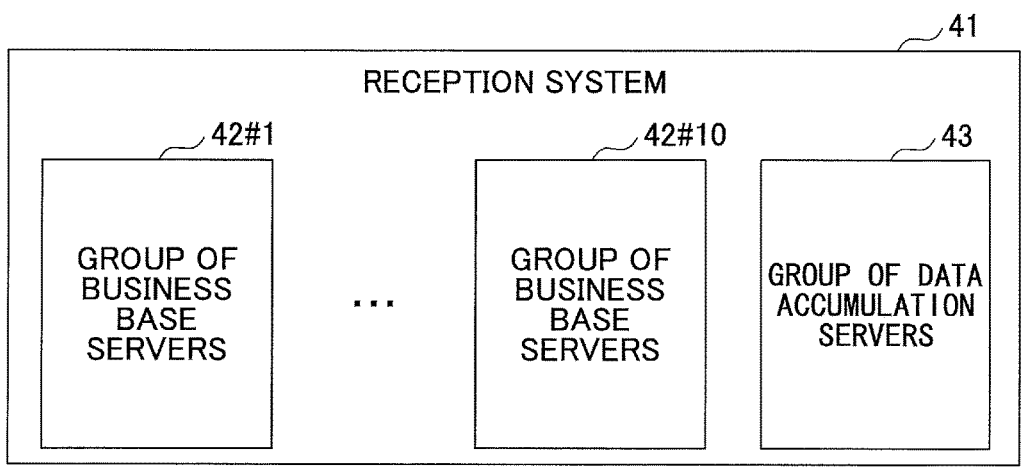
FIG. 17A is a diagram for illustrating a system configuration in accordance with a great business volume at an early stage.
Figure 17B:
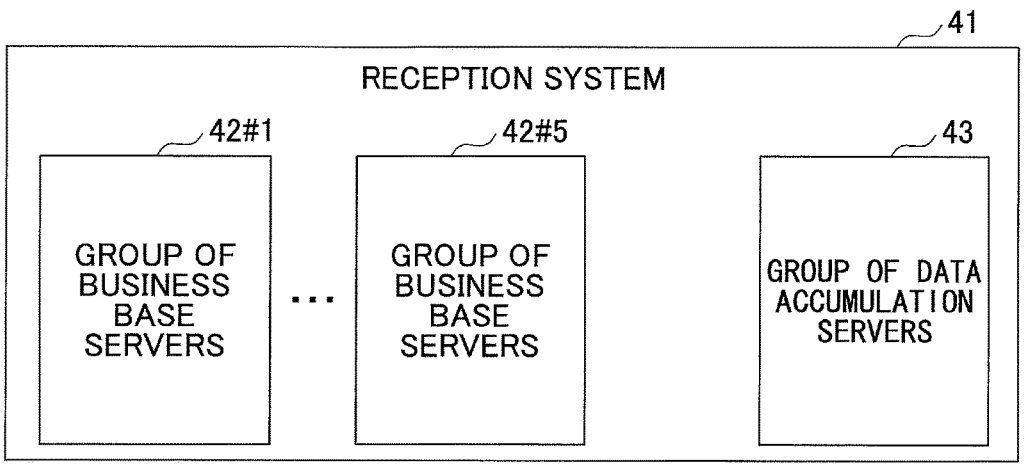
FIG. 17B is a diagram for illustrating a system configuration in accordance with a decreased business volume at the following stage.
Figure 17C:
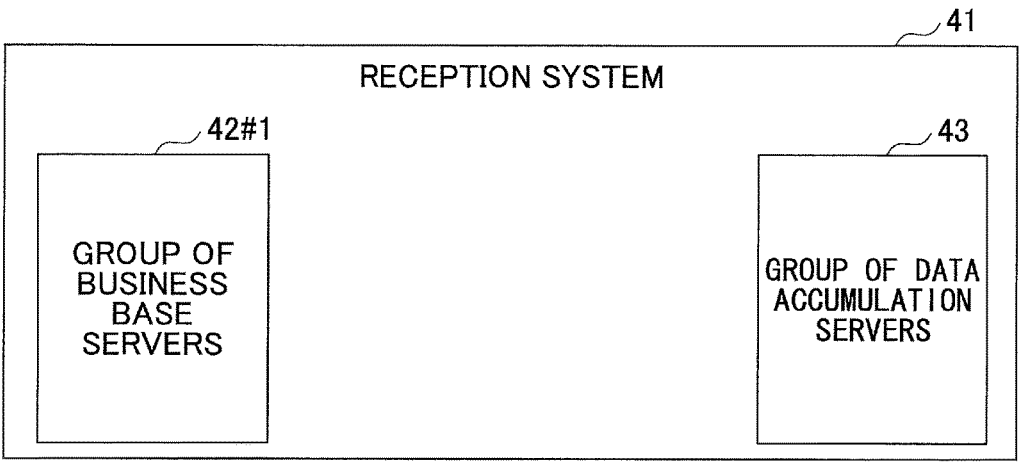
FIG. 17C is a diagram for illustrating a system configuration in accordance with a business volume converged to a constant volume.

FIG. 17A, FIG. 17B and FIG. 17C are diagrams respectively illustrating an example system configuration in accordance with the business volume. FIG. 17A is a diagram for illustrating a system configuration in accordance with a great business volume at the early stage. In this case, the business bases of the sending/receiving entity 5 and the data entry entity 6 are ten, and a number of the groups of business base servers 42 is ten, where the groups of business base servers 42#1-42#10 are provided. FIG. 17B is a diagram for illustrating a system configuration in accordance with a decreased business volume at the following stage. In this case, the business bases of the sending/receiving entity 5 and the data entry entity 6 are five, and a number of the groups of business base servers 42 is five, where the groups of business base servers 42#1-42#5 are provided. FIG. 17C is a diagram for illustrating a system configuration in accordance with a business volume converged to a constant volume. In this case, the business base of the sending/receiving entity 5 and the data entry entity 6 is one, and a number of the group of business base servers 42 is one, where the group of business base servers 42#1 is provided. That is, the system configuration of the reception system 41 can be changed as necessary on a group of business base servers 42-by-group of business base servers 42 basis.

Also, configurations of the respective groups of business base servers 42 and the group of data accumulation servers 43 can be also changed, where numbers of computers or network apparatuses and storage capacity of disk devices included in the respective group of servers can be increased or decreased.

By achieving the reception system 41 using the cloud environment 4, operation cost can be optimized since the entity is not required to purchase the computers and the network apparatuses by itself, and the entity may only pay the fee for using the cloud environment 4 in accordance with the business volume varying in the respective stages.

Meanwhile, as shown in FIG. 1, the reception system 41 is operated by business operator such as the collection contracting entity 3, sending/receiving entity 5, and data entry entity 6 who contracts to collect the my-number items in response to a request from the collection requesting entity 2 such as a company, and a financial institution, where the dispatch request data is received by the reception system 41 and the delivery data is provided from the reception system 41. Also, the data entry operation of millions, or tens of millions of the my-number items is expected to be outsourced to a plurality of data entry entities 6 (not one data entry entity 6). However, the number of the data entry entities 6 will decrease as the business volume decreases.

The business operator may observe a state of request to control a capacity of the group of business base servers 42. However, the business operator may assign one or more groups of business base servers 42 to the data entry entity 6, where the group of data accumulation servers 43 of the reception system 41 manages the correspondence relation thereof. In this case, the reception system 41 can control increase and decrease of the groups of business base servers 42 in accordance with increase and decrease of the data entry entities 6.

That is, the business operator inputs a new registration of the data entry entity 6 and a number of the groups of business base servers 42 assigned to the newly registered data entry entity 6 into the reception system 41 in a case where the number of data entry entity 6 increases. The group of data accumulation servers 43 of the reception system 41 allocates a business operator ID for identifying the newly registered data entry entity 6, and registers IDs of the groups of business base servers 42 assigned to the newly registered data entry entity 6 associated with the allocated business operator ID.

Also, in a case where the number of data entry entity 6 decreases, the business operator requests the reception system 41 to delete the data entry entity 6. The group of data accumulation servers 43 of the reception system 41 prohibits usage of the groups of business base servers 42 whose IDs are associated with the business operator ID of the deleted data entry entity 6. Thus, the business operator can flexibly change a number of the servers included in the reception system 41 rented from a cloud service operator, thereby saving business expense.

SUMMARY

As described above, according to the present embodiment, the information security in the operation of personal information items collection can be ensured.

Herein above, although the invention has been described with respect to a specific embodiment for a complete and clear disclosure, the appended claims are not to be thus limited but are to be construed as embodying all modifications and alternative constructions that may occur to one skilled in the art that fairly fall within the basic teaching set forth herein.

Terms in Embodiments and Terms in Claims

The "multifunction peripheral 54" is an example of an "image reading unit". The "terminal apparatus 52" is an example of an "image dividing unit". The "reception system 41" is an example of a "correspondence management unit". The "terminal apparatus 61" is an example of a "data entry unit". Also, the "reception system 41" is an example of a "connection unit". Further, the "reception system 41" is an example of a "data confirmation unit".

The present application is based on Japanese Priority Application No. 2014-251089 filed on Dec. 11, 2014, and Japanese Priority Application No. 2015-237297 filed on Dec. 4, 2015, the entire contents of which are hereby incorporated herein by reference.

What is claimed is:

1. A personal information collection system comprising:
a processor that is configured to:
   acquire an image of a plurality of documents, each document including a plurality of sheets, the plurality of sheets including at least one form having personal information;
   identify an image of the each form included in the image of the plurality of documents by analyzing the acquired image of the plurality of documents;
   identify an image of the each document based on the identified image of the each form;
   divide a part of the image of the each form into a plurality of divided images, said part being corresponding to a region that has the personal information;
   manage the acquired image of the plurality of documents by each document and correspondence relation between the divided images and an original image that is the part of the image of the form before being divided;
   select at least one of the divided images among the plurality of divided images of the plurality of documents;
   accept data input via a screen displaying the selected divided images;
   connect plural sets of the input data based on the correspondence relation, and determine correctness of the connected input data to confirm accepted input data;

wherein the processor is further configured to manage the correspondence relation between the divided images and the original image based on a collection ID with a sub-number for indicating respective division sequences of the divided images, the collection ID being used for identifying the each document; and wherein the processor is further configured to:

extract a collection ID from the image of the plurality of documents, the collection ID being included in the form, each form having different collection ID, and wherein the processor identifies the image of each document based on the different collection IDs.

2. The personal information collection system as claimed in claim 1, wherein the personal information includes a set of series of numbers that is unique to an each individual.

3. A personal information collection method performed by a personal information collection apparatus, the method comprising:

acquiring an image of a plurality of documents, each document including a plurality of sheets, the plurality of sheets including at least one form having personal information;

identifying an image of the each form included in the image of the plurality of documents by analyzing the acquired image of the plurality of documents;

identifying an image of the each document based on the identified image of the each form;

dividing a part of the image of the each form into a plurality of divided images, said part being corresponding to a region having the personal information;

managing the acquired image of the plurality of documents by each document and correspondence relation between the divided images and an original image that is the part of the image of the form before being divided;

selecting at least one of the divided images among the plurality of divided images of the plurality of documents;

accepting data input via a screen displaying the selected divided images;

connecting plural sets of the input data based on the correspondence relation, and determining correctness of the connected input data to confirm accepted input data; and further comprising:

managing the correspondence relation between the divided images and the original image based on a collection ID with a sub-number for indicating respective division sequences of the divided images, the collection ID being used for identifying the each document; and extracting a collection ID from the image of the plurality of documents, the collection ID being included in the form, each form having different collection ID, and identifying the image of each document based on the different collection IDs.

4. The method as claimed in claim 3, wherein the personal information includes a set of series of numbers that is unique to an each individual.

5. A non-transitory computer-readable recording medium having stored therein a program for causing a computer to execute a method including the steps of:

acquiring an image of a plurality of documents, each document including a plurality of sheets, the plurality of sheets including at least one form having personal information;

identifying an image of the each form included in the image of the plurality of documents by analyzing the acquired image of the plurality of documents;

identifying an image of the each document based on the identified image of the each form;

dividing a part of the image of the each form into a plurality of divided images, said part being corresponding to a region having the personal information;

managing the acquired image of the plurality of documents by each document and correspondence relation between the divided images and an original image that is the part of the image of the form before being divided;

selecting at least one of the divided images among the plurality of divided images of the plurality of documents;

accepting data input via a screen displaying the selected divided images;

connecting plural sets of the input data based on the correspondence relation, and determining correctness of the connected input data to confirm accepted input data; and further including the steps of:

managing the correspondence relation between the divided images and the original image based on a collection ID with a sub-number for indicating respective division sequences of the divided images, the collection ID being used for identifying the each document; and extracting a collection ID from the image of the plurality of documents, the collection ID being included in the form, each form having different collection ID, and identifying the image of each document based on the different collection IDs.

6. The non-transitory computer-readable recording medium as claimed in claim 5, wherein the personal information includes a set of series of numbers that is unique to an each individual.

* * * * *